Nov. 5, 1929.   R. S. BLAIR   1,734,284
TELESCOPE CONSTRUCTION
Filed Nov. 9, 1922

Inventor
Robert S. Blair

Patented Nov. 5, 1929

1,734,284

UNITED STATES PATENT OFFICE

ROBERT S. BLAIR, OF STAMFORD, CONNECTICUT

TELESCOPE CONSTRUCTION

Application filed November 9, 1922. Serial No. 599,812.

This invention relates to telescopes and, with regard to its more specific features, to telescopes of large size.

One of the objects thereof is to provide a telescope of large size such as employed in astronomical observatories which is highly dependable and efficient in action. Another object is to provide such a telescope which is not susceptible to loss of accuracy due to the large size and weight of its component parts. Another object is to provide a telescope of the above nature wherein a uniformity of accuracy is assured regardless of the position or angle in which the telescope is directed. Another object is to provide a simple and practical art whereby telescopes of the above nature may be operated in a dependable and efficient manner to maintain a high degree of accuracy. Other objects will be in part obvious or in part pointed out hereinafter.

The invention accordingly consists in the features of construction, combinations of elements, arrangements of parts, and in the various steps of process which will be exemplified in the structure hereinafter described and the scope of the application of which will be indicated in the following claims.

In the accompanying drawing, in which is shown one of the various possible embodiments of the mechanical features of this invention.

Similar reference characters refer to similar parts throughout the several views of the drawing.

As conducive to a clearer understanding of certain features of this invention, it may be here noted that telescopes such as employed in astronomical observatories, for example, are often of huge proportions and the lenses employed therein are of exceptionally large size and hence of great weight. Difficulty is experienced in that the object lens mounted at the outer end of the telescope tube due to its weight tends to sag at the center when the telescope is raised toward vertical position. Such sagging and distortion of the lens impairs the accuracy of the instrument. Thus clearly the size, and hence the power, of such telescopes are virtually limited by the size and weight of the lens which may be safely employed without danger of sagging. The provision of means whereby such limitations may be successfully overcome is one of the dominant aims of this invention.

Figure 1:
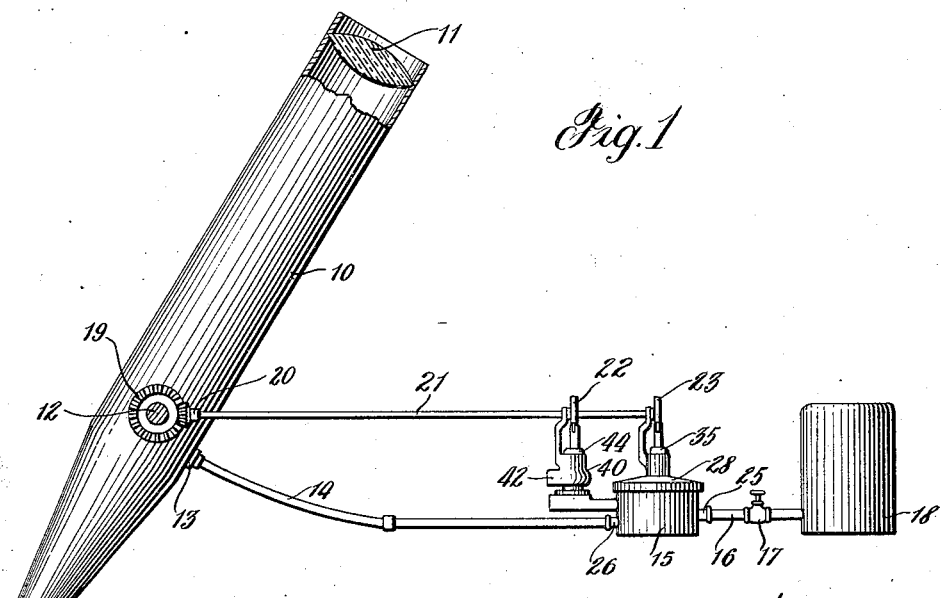
Figure 1 is a side elevation of an astronomical telescope and associated mechanism, certain parts being cut away.

Referring now to the drawing in detail, in Fig. 1 there is represented an astronomical telescope of large size comprising a hollow casing 10, the object lens 11 being shown supported adjacent the outer end thereof. The lens 11 is preferably supported about its edges within the casing 10 in such a manner that it forms a substantially air-tight closure at that end of the casing, the other end being similarly closed by the smaller eye-piece lens, not shown in the drawing. The telescope is mounted upon trunnions 12 which are supported to rotate about a lateral axis to vary the vertical angle of the telescope from a substantially horizontal position to the vertical. The mountings of the trunnions 12 and the rotating mechanism therefor are not shown since they have nothing to do with this invention. It will also be understood that the telescope and its supporting means are mounted to rotate about a vertical axis in the usual manner to provide for lateral adjustment of the direction of the telescope.

Connected with the interior of the telescope 10 as at 13 is a flexible pipe 14 which extends to an automatic valve mechanism indicated at 15 in Fig. 1 which will be later described in detail. The valve mechanism 15 is connected by a pipe 16 having a valve 17 therein to a tank 18 in which is stored dry air under pressure. Fixed upon the trunnion 12, which as before mentioned rotates about the lateral axis with the telescope, is a bevel gear 19 in mesh with a gear 20 which is fixed upon a shaft 21. The rotation of the shaft 21 actuated by the rotation of the telescope and the trunnion 12 through a pair of cams 22 and 23 regulates the action of the automatic valve mechanism 15 as will be described.

Figures 2, 3:
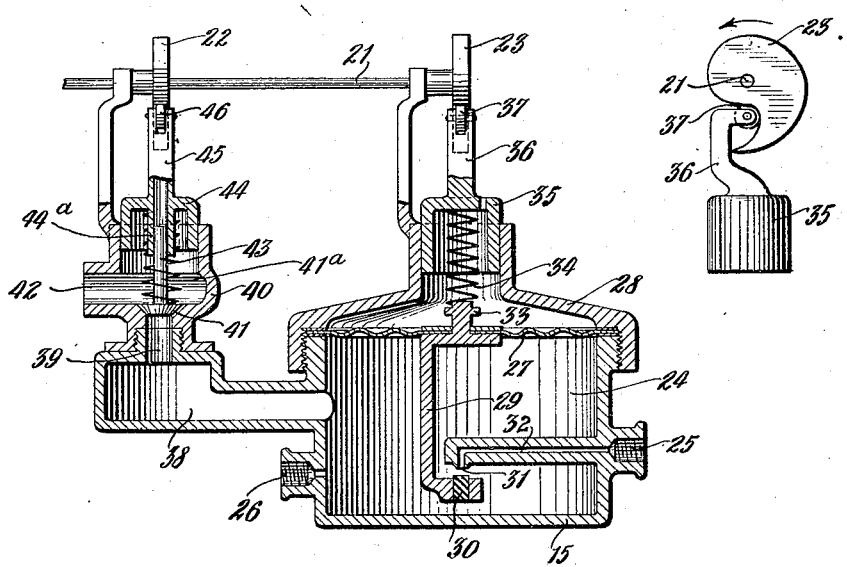
Figure 2 is an enlarged vertical sectional elevation of certain parts shown in Fig. 1.
Figure 3 is a detached end elevation of certain parts shown in Fig. 2.

Referring now to Fig. 2, there is shown in enlarged detail a vertical cross section of the valve mechanism 15 and its connection with its regulating mechanism. The main body of the valve comprises a chamber 24 provided with an opening 25 and an opening 26 through which connections are respectively made to the pressure tank 18 and the telescope 10, as described with regard to Fig. 1. The top of the chamber 24 is closed by a diaphragm 27 held tightly in place by a cap 28 threaded upon the walls of the chamber 24. The diaphragm 27 carries a dependent L-shaped member 29 in the lower end of which is secured a member 30 which preferably comprises a soft rubber plug or valve seat. The plug 30 is positioned directly opposite the opening 31 which communicates by means of a passage 32 with the opening 25 and the pressure tank 18. The plug 30 is thus adapted to cooperate with the opening 31 to connect or disconnect the chamber 24 with the pressure tank 18. The upper end of the member 29 passes through the diaphragm 27 and terminates in a projection 33 against which bears a coiled compression spring 34. The spring 34 bears upwardly against a cup-shaped member 35 which is slidably mounted in an upward extension of the cap 28. The member 35 is provided with an upward forked extension 36 in which is rotatably mounted a roller 37 in engagement with the cam 23 secured to the shaft 21 as before described. From the above it will be seen that the spring 34 bears against the diaphragm 27 in opposition to pressure within the chamber 24 and that a pressure of the spring 34 greater than the pressure within the chamber 24 will hold the valve seat 30 away from the opening 31 as shown in Fig. 2. On the other hand, a pressure within chamber 24, which is in connection with the interior of the telescope casing by the pipe 14, greater than that exerted by spring 34 will raise the plug 30 against the opening 31 and close the passage communicating with the pressure chamber 18. By rotation of the cam 23 against which the roller follower 37 bears, the compression in the spring 34 may be varied.

The chamber 24 is in communication with a chamber 38 provided with a passage 39 upon which is threaded a valve casing 40. Within the valve casing 40 is a valve 41 controlling the passage between the chamber 38 and the interior of the casing 40 which is provided with an exhaust opening 42. Bearing against the valve 41 and forcing it downwardly toward its seat is a compression spring 43 which also bears upwardly against a member 44 slidably mounted in an upward extension of the casing 40. A sleeve 44ª formed in the member 44 serves as a guide for the spindle 41ª secured to the valve 41. The member 44 is provided with an upward forked extension 45 in which is rotatably mounted a roller 46 in engagement with the cam 22 mounted upon the shaft 21 as before described. Thus the spring 43 acts in opposition to the pressure within the chamber 38, that is, the pressure within the chamber 24 and within the telescope casing 10 to maintain the valve 41 in closed position. A pressure within chamber 38 greater than the pressure exerted by the spring 43 will open the valve 41, and a pressure of the spring 43 greater than the pressure within the chamber 38 will maintain the valve 41 in closed position. By rotation of the cam 22 against which the roller 46 bears, the compression in the spring 43 may be varied.

Considering now the action of this mechanism, the dry air under pressure is led from tank 18 through the automatic valve mechanism 15 and into the telescope tube 10. Thus there is provided a pressure against the inner surface of the lens 11 which tends to counterbalance the tendency of the lens to sag due to its weight. The force tending to cause the lens to sag varies as the angle of the telescope changes. For example, when the telescope is in horizontal position the lens rests upon its edge and there is no sagging tendency, and when the telescope is in vertical position the tendency is maximum. For each particular angle of the telescope there is a different pressure which must be exerted beneath the lens to substantially counterbalance the tendency of the lens to sag due to its weight. The cams 22 and 23 are shaped so that through the action of the automatic valve mechanism, as will be described, substantially the proper pressure is maintained in the telescope at each angle of its position to counterbalance the tendency of the lens to sag at that angle. The pressure in the tank 18 is preferably maintained just slightly higher than the maximum pressure required in the telescope tube. The gears 19 and 20 are arranged so that the cams 22 and 23 make a full revolution while the telescope is turning through 90°.

Assuming now that the telescope is in approximately horizontal position, there will be little or no pressure required in the telescope tube and there will be little or no compression placed in the spring 34, the cam 23 being in position with respect to its follower 37 substantially as shown in Fig. 3. The air pressure from the tank 18 will now build up a very little pressure in the chamber 24 and the telescope tube 10, and the valve 31 will be closed by the action of the diaphragm 27. As the telescope is raised, the cam 23 turns in the direction indicated by the arrow in Fig. 3, the member 35 is forced downwardly thereby and compression is placed in the spring 34. This results in the opening of the valve 31, which remains open until pressure has been built up within the chamber 24 and in the telescope tube 10 to counteract the pressure exerted by the spring 34 upon the diaphragm 27, when the valve 31 closes again. The cam 23 is so shaped that for each position of the telescope sufficient compression will be placed in the spring 34 to insure the maintenance of a pressure within the chamber 24 and hence the telescope tube 10 which is approximately high enough to counteract the sagging tendency of the lens at that angle.

The spring 43 controlling the exhaust valve 41 is so arranged that at each angle of the telescope there is required a little greater pressure to counteract its action and open the valve 41 than is required to counteract the action of the spring 34 and close the valve 31. The cam 22 is shaped substantially the same as the cam 23 and the two springs may be of the same compressive strength, the requirement being that at the horizontal position of the telescope when there is no compression in the spring 34 there be a little compression in the spring 43. This difference will remain constant if the cams are the same and the springs are of the same strength. Thus, as the telescope rises and the pressure builds up in the chamber 24 and the telescope tube 10 through the action of the diaphragm 27 and the valve 31, the valve 41 will remain in closed position.

Now assume that the telescope is at any angle, for example, as shown in Fig. 1, there being the desired pressure in the casing 10 and the chamber 24 and both valves 41 and 31 being closed. As the telescope is lowered, the action of the cam 23 decreases the compression in the spring 34 and the valve 31 remains closed. At the same time the action of the cam 22 decreases the compression in the spring 43 and the pressure within the chamber 24 opens the valve 41 and pressure starts to escape through the passage 42. When the telescope is brought to rest from its downward travel the pressure within the chamber 24 and the telescope tube 10 escapes through the valve 41 until it is a little less than the force of compression in the spring 43 at that point and then the valve 41 closes. Since the spring 43 is always exerting a little more force than the spring 34, the valve 31 remains closed during the lowering of the telescope. If now the telescope is raised again, the valve 31 comes into action as before described and the pressure builds up again in the chamber 24 and the telescope tube 10, a definite pressure being had for each angle of the telescope as governed by the shape of the cams 22 and 23.

It will thus be seen that there is herein provided an art and apparatus wherein the objects of this invention are achieved and that the same are well adapted to meet the requirements of practical use.

As many possible embodiments may be made of the mechanical features of the above invention and as the art herein described might be varied in various parts, all without departing from the scope of the invention, it is to be understood that all matter herein set forth or shown in the accompanying drawings is to be interpreted as illustrative and not in a limiting sense.

I claim as my invention:

1. In telescope construction, in combination, a telescope having a magnifying element mounted thereon, and means providing a fluid under pressure beneath said magnifying element adapted to prevent distortion thereof due to its weight.

2. In telescope construction, in combination, a telescope having a magnifying element mounted thereon, means providing a fluid under pressure beneath said magnifying element adapted to prevent distortion thereof due to its weight, and means automatically controlling said pressure to increase the same as said magnifying element approaches a horizontal position.

3. In telescope construction, in combination, a substantially air-tight telescope tube, a lens in a non-vertical position forming a closure therefor adjacent one end thereof, and means providing air pressure within said tube to bear against the under surface of said lens and support the same.

4. In telescope construction, in combination, a telescope tube mounted to swing about a substantially lateral axis, a lens therein secured thereto about its periphery, means substantially transpicuous to vision through said lens and supporting said lens about its central portion, and automatic means adapted to vary the force exerted by said supporting means as said telescope is swung and increasing the same as the lens approaches a horizontal position.

5. In telescope construction, in combination, a substantially air-tight telescope tube mounted to swing about a substantially lateral axis, a lens forming a closure therefor adjacent one end thereof, means providing fluid pressure within said tube to bear against said lens and support the same, and automatic means adapted to vary said pressure as said telescope is swung.

6. In telescope construction, in combination, a substantially air-tight telescope tube mounted to swing about a substantially lateral axis, a lens forming a closure therefor adjacent one end thereof, means providing fluid pressure within said tube to bear against said lens and support the same, and means governed by the swinging of said telescope adapted to vary said pressure.

7. In telescope construction, in combination, a telescope tube mounted to swing about a substantially lateral axis, a lens mounted transversely thereof, means associated with said tube adapted to exert fluid pressure upon said lens to counteract its tendency to sag, and means adapted to automatically vary the amount of said pressure as said telescope is swung.

8. In telescope construction, in combination, a telescope having a lens in a non-vertical position, and a source of fluid under pressure connected with the interior of said telescope, said fluid under pressure being adapted to act upon the under surface of and support said lens.

9. In telescope construction, in combination, a telescope having a lens, means mounting said telescope to swing about said axis, a source of fluid under pressure connected with the interior of said telescope said fluid under pressure being adapted to support said lens, and means interposed between said source of fluid and said telescope adapted to automatically vary the fluid pressure supporting said lens as said telescope is swung about said axis.

10. In telescope construction, in combination, a telescope having a lens, means mounting said telescope to swing about an axis, a source of fluid under pressure connected with the interior of said telescope said fluid under pressure being adapted to support said lens, and means governed by the swinging of said telescope about said axis interposed between said source of fluid and said telescope adapted to vary the fluid pressure supporting said lens.

11. In telescope construction, in combination, a telescope tube adapted to swing about a substantially lateral axis, a lens supported therein, means providing pressure adapted to bear against the surface of said lens to counteract its tendency to sag, and means adapted automatically to vary said pressure to substantially correspond with the variations in said tendency of said lens to sag, as said telescope is swung.

12. In telescope construction, in combination, a telescope tube adapted to be directed upwardly and having a lens positioned transversely thereof, and means for applying fluid pressure against the under surface of said lens to support the same.

13. In telescope construction, in combination, a lens, means in which the edges of said lens lie, and a supporting element operating upon said lens intermediate its edges and tending to counteract sagging of said lens due to its weight, said supporting element being transpicuous to vision through said lens.

14. In telescope construction, in combination, a telescope tube mounted to swing about an axis transverse thereto, a magnifying element coacting with said tube and secured thereto about its periphery, means supporting said magnifying element intermediate its edges, and means adapted to vary the force exerted by said supporting means as said telescope is swung increasing the same and decreasing the same as said element swings toward and away from a horizontal position.

In testimony whereof, I have signed my name to this specification this 6 day of November, 1922.

ROBERT S. BLAIR.